United States Patent
Silva et al.

(10) Patent No.: US 6,562,937 B2
(45) Date of Patent: May 13, 2003

(54) CONTINUOUS PREPARATION OF POLYCARBONATE

(75) Inventors: James Manio Silva, Clifton Park; David Michel Dardaris, Ballston Spa; Thomas Joseph Fyvie, Schenectady; Daniel Joseph Brunelle, Burnt Hills, all of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/795,180

(22) Filed: Mar. 1, 2001

(65) Prior Publication Data

US 2002/0035234 A1 Mar. 21, 2002

Related U.S. Application Data

(63) Continuation-in-part of application No. 09/625,476, filed on Jul. 25, 2000.

(51) Int. Cl.⁷ ............................................. C08H 63/68
(52) U.S. Cl. .................. 528/202; 528/198; 528/196
(58) Field of Search ................ 528/202, 196, 528/198

(56) References Cited

U.S. PATENT DOCUMENTS

| | | |
|---|---|---|
| 5,095,088 A | 3/1992 | Wang |
| 5,200,496 A | 4/1993 | Munjal et al. |
| 5,212,281 A | 5/1993 | Munjal et al. ............... 528/202 |
| 5,218,078 A | 6/1993 | Marks et al. ............... 528/202 |
| 5,258,484 A | 11/1993 | Schomacker et al. |
| 5,321,115 A | 6/1994 | Marks et al. ............... 528/202 |
| 5,362,841 A | 11/1994 | Munjal et al. ............... 528/202 |
| 5,426,170 A | 6/1995 | Hirao et al. |

OTHER PUBLICATIONS

"The Interfacial Polycondensation of Tetrabromobisphenol–A Polycarbonate", by Jen–Tau Gu et al., Applied Macromolecular Chemistry and Physics, 208(1993) May, Basel, CH pp. 65–67.

Primary Examiner—Terressa M. Boykin
(74) Attorney, Agent, or Firm—Andrew J. Caruso; Noreen C. Johnson

(57) ABSTRACT

In a continuous flow reactor one or more bisphenols is converted by the action of phosgene and aqueous base into a mixture of mono- and bisphenol chloroformates which are then treated with a catalyst, additional aqueous caustic and a monophenol to afford endcapped polycarbonates. At relatively high levels of added monophenol endcapped polycarbonate oligomers are obtained. The method is especially suited for the continuous preparation of endcapped oligomers of tetrabromobisphenol A polycarbonate. The method is characterized by efficient use of phosgene, and conversion of chloroformate groups to carbonate linkages aided by trialkylamine catalysts bearing at least one methyl group on nitrogen, such as N,N-dimethylbutylamine (DMBA).

32 Claims, 1 Drawing Sheet

CONTINUOUS PREPARATION OF POLYCARBONATE

RELATED APPLICATION

This application is a continuation-in-part of copending U.S. application Ser. No. 09/625,476, filed Jul. 25, 2000, which is incorporated herein by reference.

BACKGROUND OF THE INVENTION

This invention relates to a process and apparatus for the continuous preparation of polycarbonates by an interfacial process.

Polycarbonates derived from substituted bisphenols such as halogenated bisphenols are useful materials combining unique physical properties with the flame retardant behavior common to halogenated polycarbonates. For example, membranes made from high molecular weight tetrabromobisphenol A polycarbonate have shown high selectivity for the separation of mixtures of oxygen and nitrogen gases. Tetrabromobisphenol A polycarbonate has been shown to serve as a flame retardant material as well.

In making endcapped polycarbonates from substituted bisphenols such as halogenated bisphenols via an interfacial process, it is desirable to minimize the amount of residual monomer, endcapping agent and by-product diarylcarbonate in the product polycarbonate.

The presence of excessive amounts of residual monomer, endcapping agent or by-product diarylcarbonate in the product polycarbonate is undesirable since when a polycarbonate containing said residual monomer, endcapping agent or by-product diarylcarbonate is subjected to melt processing, as in a molding step, molding cycle times tend to be increased thereby reducing the molding equipment efficiency. Halogenated bisphenol derived polycarbonates containing significant levels of residual monomer, endcapping agent or by-product diarylcarbonate require longer molding cycle times compared with halogenated bisphenol derived polycarbonates that are substantially free of said residual monomer, endcapping agent and diarylcarbonates. Further, because residual monomer, endcapping agent and by-product diarylcarbonate tend to migrate to the polymer surface, the presence of said residual monomer, endcapping agent or by-product diarylcarbonate in a polycarbonate can lead to undesirable effects, such as "plate out" during molding operations. The low molecular weight species present in the polycarbonate from previous molding cycles are deposited on the mold surfaces. The presence of said low molecular weight species on the mold surfaces leads to blemishes in subsequently molded articles. Further, volatile residual monomers, endcapping agents and diarylcarbonates when present in a polycarbonate undergoing extruder melt processing have a tendency to condense and plug extruder vent lines thereby necessitating more frequent maintenance than would otherwise be required and resulting in equipment outages.

It would be desirable to develop a continuous interfacial process for the conversion of substituted bisphenols such as halogenated bisphenols directly into endcapped polycarbonates in a continuous manner while minimizing the presence of residual monomer, endcapping agent and by-product diarylcarbonate in the product polycarbonate. In addition, it would be desirable to develop a continuous interfacial process involving relatively short reactant residence times in the reactor system, and making efficient use of phosgene to produce endcapped polycarbonate oligomers of halogenated bisphenols having low levels of residual monomer, endcapping agent and by-product diarylcarbonate.

BRIEF SUMMARY OF THE INVENTION

The present invention addresses these problems, and provides further surprising properties. These and further objects of the invention will be more readily appreciated when considering the following disclosure and appended claims.

In one aspect the present invention relates to a continuous process for the preparation of polycarbonate comprising the following steps:

Step (A) introducing into a continuous reactor system phosgene, at least one solvent, at least one bisphenol, caustic, and optionally one or more catalysts, thereby forming a flowing reaction mixture; said phosgene, solvent, bisphenol, caustic, and catalyst being introduced as components of at least 2 feed streams;

Step (B) passing the flowing reaction mixture formed in Step (A) through said continuous reactor system until substantially all of the phosgene has been consumed;

Step (C) introducing into said flowing reaction mixture in which substantially all of the phosgene has been consumed, caustic, at least one endcapping agent, optionally one or more solvents, and at least one catalyst; said caustic, endcapping agent, solvent and catalyst being introduced as one or more feed streams; and Step D) allowing the reaction mixture formed in steps (A)–(C) to react to form a product polycarbonate and continuously removing said product polycarbonate from the continuous reactor system.

The present invention further relates to a continuous process for the production of endcapped oligomeric polycarbonates of substituted bisphenols, such as halogenated bisphenols, in which one or more bisphenols is converted in a continuous manner into a mixture comprising a bisphenol monochloroformate, and a bisphenol bischloroformate, said mixture of bisphenol chloroformates being converted in a continuous manner into endcapped oligomeric polycarbonate.

BRIEF DESCRIPTION OF THE DRAWINGS

The features and advantages of the present invention will become apparent from the following detailed description of the invention which when read with the accompanying FIGURE illustrate preferred embodiments of the invention.

The FIGURE is a schematic view of a continuous reactor system used in one embodiment of the present invention.

DETAILED DESCRIPTION OF THE INVENTION

Figure 1:
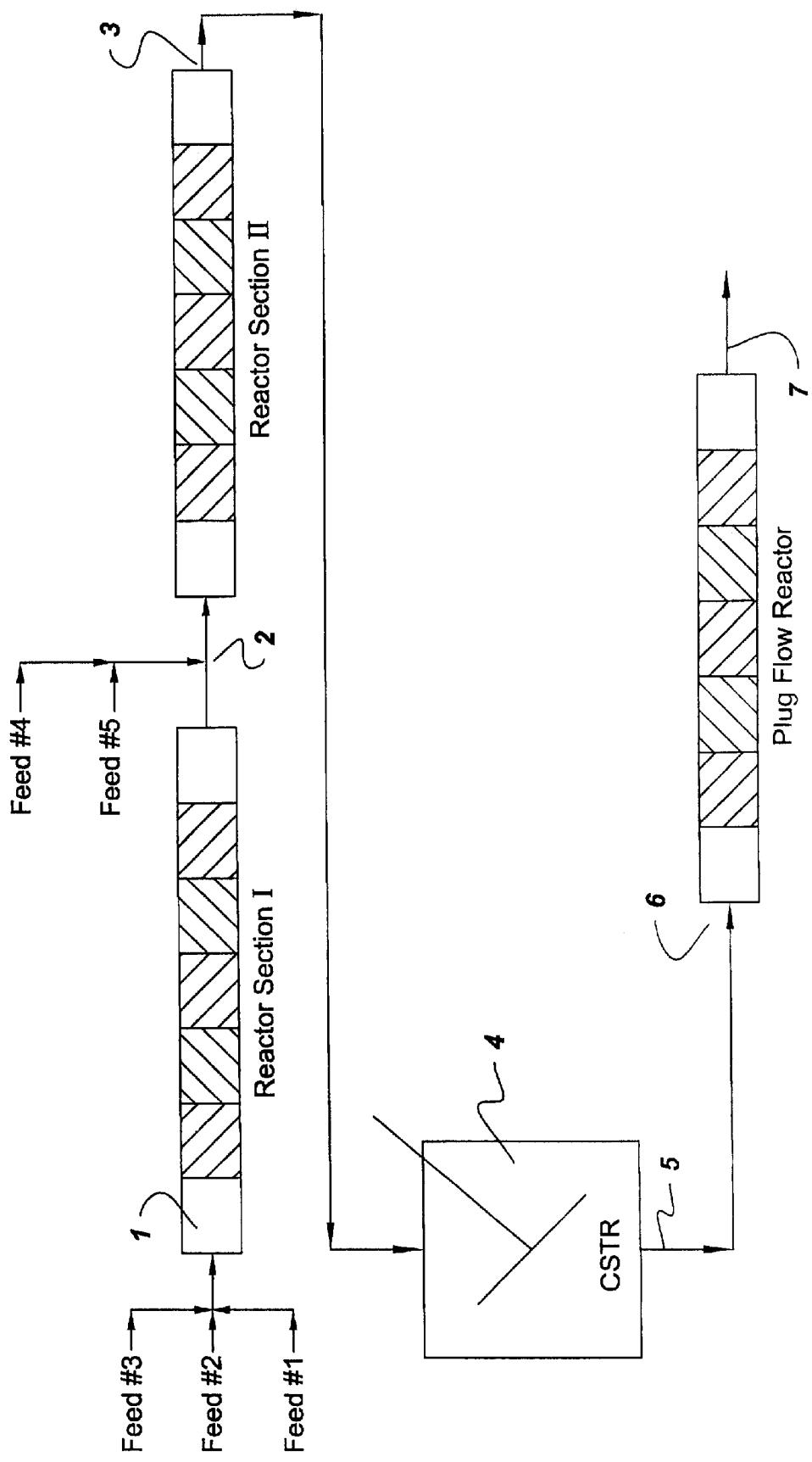

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

As used herein the term "interfacial process" refers to a process comprising the simultaneous use of water and a water immiscible solvent.

The term "polycarbonate" as used herein includes copolycarbonates, homopolycarbonates and (co)polyestercarbonates.

As used herein the term "polycarbonate" refers to both high molecular weight polycarbonate and low molecular weight polycarbonate.

High molecular weight polycarbonate is defined herein as polycarbonate having a weight average molecular weight ($M_w$) of more than 10,000 daltons.

Low molecular weight polycarbonate is defined herein as polycarbonate having a weight average molecular weight ($M_w$) of 10,000 daltons or less.

The terms "low molecular weight polycarbonate", "oligomeric polycarbonate" and "polycarbonate oligomers" are used interchangeably.

The term "endcapped polycarbonate" refers to a polycarbonate in which the majority of the chain endgroups present in the polymer are derived from an endcapping agent. For example, a polycarbonate in which 51% of the chain endgroups are derived from phenol constitutes an "endcapped polycarbonate".

The terms "endcapping agent", "chain stopping agent" and "chain stopper" are used interchangeably.

As used herein the term "substantially all" means 75 percent or more. For example, the phrase "when substantially all of the phosgene introduced in step (A) has reacted" means that at least 75% of the phosgene introduced in step (A) has been consumed.

"Molar flow rate" is in moles per minute, unless otherwise stated and refers to the number of moles of a particular component such as phosgene, bisphenol, caustic, or catalyst introduced into the continuous reactor system per unit time.

The term "molar flow ratio" refers to the ratio of two molar flow rates.

As used herein the term "caustic" refers to an aqueous solution of an alkaline earth metal hydroxide, such as calcium hydroxide, or an aqueous solution of an alkali metal hydroxide, such as sodium hydroxide or potassium hydroxide.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

In one aspect, the present invention relates to a continuous interfacial process for the conversion of substituted bisphenols such as halogenated bisphenols into bisphenol polycarbonates in a continuous reactor system. By "continuous" it is meant that reactants are introduced and products are withdrawn from the reactor system simultaneously.

In one embodiment, the continuous reactor system of the instant invention is a tubular reactor comprising a series of feed inlets and a product outlet. One end of said tubular reactor comprises at least two inlets through which are fed at least one bisphenol, at least one solvent, phosgene, caustic, and optionally a catalyst, thereby forming a flowing reaction mixture. The introduction into the tubular reactor of said bisphenol, solvent, phosgene, caustic, and catalyst comprises step (A) of the process of the instant invention. The mixture introduced into the tubular reactor in step (A) flows through the tubular reactor until substantially all of the phosgene introduced has reacted with the bisphenol to give a mixture comprising mono- and bischloroformates of said bisphenol. A portion of the phosgene introduced in step (A) may also be consumed by hydrolysis. The reaction of said bisphenol with phosgene as the reactants pass through a section of the tubular reactor of sufficient length to allow consumption of substantially all of the phosgene introduced in step (A), is referred to as step (B). Next, a catalyst, caustic, endcapping agent, and optionally additional solvent are introduced at a point along the tubular reactor at which step (B) is complete. As noted, step (B) is complete when substantially all of the phosgene introduced in step (A) has reacted with the bisphenol to give a mixture comprising mono- and bischloroformates of said bisphenol or has suffered hydrolysis. The introduction of the catalyst, caustic, endcapping agent and optionally additional solvent comprises step (C) of the process of the present invention. Following step (C), the mixture of chloroformates produced in step (B) is converted into polycarbonate by the action of the catalyst, the caustic, and the endcapping agent introduced in step (C). This conversion of the mixture of the chloroformates produced in step (B) into polycarbonate by the action of the reagents introduced in step (C) is referred to as step (D). In step (D) the conversion of the mixture formed in steps (A)–(C) to product polycarbonate is carried to completion and the product polycarbonate exits the tubular reactor at its outlet. Step (D) is considered complete when the concentration of chloroformate groups present falls below a detectable level. For example, with the phosgene-sensitive paper used herein, the detection limit is about 0.0007 mole-equivalents of chloroformate group per liter of the organic phase.

The process of the instant invention is not limited to tubular reactors, but may be conducted in any equipment arrangement in which steps (A), (B), (C), and (D) are carried out on a continuous basis. An equipment arrangement wherein steps (A), (B), (C), and (D) are carried out on a continuous basis is defined as a continuous reactor system. The continuous reactor system used in steps (A), (B), (C) and (D) of the present invention may, for example, comprise a tubular reactor, a series of tubular reactors, a series of continuous stirred tank reactors, a combination of at least one tubular reactor with at least one continuous stirred tank reactor, at least one loop reactor, a plurality of loop reactors arranged in series or in a parallel configuration, an agitated column reactor, a column reactor having mixers in several stages, and a tubular reactor coupled to a continuous stirred tank reactor which is in turn coupled to a plug flow reactor. It is preferred to have as a final reactor section a substantially plug flow reactor such as a tubular reactor or an agitated column reactor.

Typically, the continuous reactor system will be configured such that reagents added in step (A) are introduced at one end of the reactor system while the reagents added in step (C) are added "downstream" relative to the "upstream" point of introduction of reactants in step (A). Because of the reactivity of phosgene the reagents introduced in step (A) are introduced in at least two feed streams. Typically, phosgene gas or phosgene dissolved in an inert solvent, is introduced as one of the feed streams; and caustic, at least one bisphenol, at least one solvent and optionally a catalyst are introduced in one or more additional feed streams. Any feed stream may be introduced into the reactor system through multiple inlets. For example, the portion of the reactor system in which step (A) is carried out might possess a series of phosgene introduction inlets and a series of inlets for the introduction of bisphenol, solvent, caustic, and catalyst. In such a case the term "the point of introduction of reactants in step (A)" refers to a multiplicity of inlets on the reactor system rather than a single location. Similarly, the reagents in step (C) may be introduced in one or more feed streams, each of which may be introduced through one or more inlets of the reactor system.

Prior to introduction into the reactor system, a feed stream or combination of feed streams may be mixed using suitable mixing means illustrated by in-line mixers, or static mixers and orifice mixers. As mentioned, "feed stream" and "feed streams" refer to the components entering the reactor system in steps (A) and (C). Mixing zones may be established before the feed streams are introduced into the reactor system or thereafter. Thus, the reactor system itself may comprise one or more mixing zones. The feed streams entering the reactor system in steps (A) and (C) preferably have a temperature in a range between about −10° C. and about 40° C.; more preferably a range between about 0° C. and about 25° C.

The process conditions used in the reactor system may be varied in order to optimize the formation of polycarbonate having low levels of residual monomer, endcapping agent and diarylcarbonate. The temperature of any portion of the reactor system may be controlled by heating or cooling. Alternatively, the reactor system may be operated adiabatically. Suitable cooling means include cooling jackets, precooler heat exchangers, reflux condensers and the like. For simplicity in both design and operation it is preferable to operate the reactor system adiabatically. In order to achieve adiabatic reactor conditions, the reactor system may be insulated according to standard industrial practice. The temperature of the reaction mixture within the reactor system is preferably maintained at a temperature between about 0° C. and about 60° C., more preferably between about 25° C. and about 50° C.

While in the reactor system, the reaction mixture is preferably agitated at an intensity at least sufficient to prevent phase separation of the aqueous and organic components. Phase separation negatively affects the process in terms of the rates at which reactants are converted into products. The mixture in the reactor system at any stage of the process corresponding to steps (A)–(D) may be agitated by mechanical mixing means, or alternatively, by static mixing elements placed within the reactor system. Static mixing technology is discussed in "Advances in Static Mixing Technology", M. Mutsakis, F. Streiff, and G. Schneider, Chemical Engineering Progress, July, 1986.

In one embodiment of the invention, the reaction to form polycarbonate is carried out in a tubular reactor, having a mixing intensity which is characterized by a tube Reynolds number, defined as:

$$N_{Re} = \frac{Dv\rho}{\mu}$$

where
  D=tube diameter (cm)
  v=solution velocity through tube (cm/sec)
  ρ=solution density (gm/cc)
  μ=solution viscosity (gm/cm–sec)

It is preferable to maintain the tube Reynolds number in the range of about 200 to about 100,000.

In step (A) of the instant invention phosgene, at least one bisphenol, at least one inert organic solvent, caustic, and optionally a catalyst are introduced via two or more feed streams into a continuous reactor system. In step (B) phosgene and bisphenol are transformed, through reactions mediated by the presence of the caustic, solvent and optionally the catalyst, into a mixture comprising bisphenol monochloroformates and bisphenol bischloroformates.

The caustic is preferably introduced as an aqueous solution comprising an alkali metal hydroxide or an alkaline earth hydroxide. The aqueous caustic solution preferably comprises potassium hydroxide, sodium hydroxide or mixtures thereof, and even more preferably comprises sodium hydroxide. Typically, the concentration of the solution of alkali metal hydroxide or alkaline earth hydroxide in water is about 5 to about 50 weight percent, preferably between about 15 and about 40 weight percent.

The aqueous caustic solution introduced in step (A) may comprise one or more bisphenols in the form of the corresponding bisphenolates, one or more catalysts, such as quaternary ammonium halides, or a mixture thereof. Similarly, the endcapping agent introduced into the reactor system in step (C) may be dissolved in aqueous caustic and introduced as an aqueous solution of the salt of the endcapping agent, for example a solution of sodium phenolate in aqueous sodium hydroxide, or a solution of sodium acetate in water. Alternatively, the bisphenol may be dissolved in an inert organic solvent, such as methylene chloride, and introduced to the reactor system in step (A) as a solution. Similarly, endcapping agent may be dissolved in an inert organic solvent, such as methylene chloride, and introduced to the reactor system in step (C) as a solution.

In step (A) the aqueous caustic solution is introduced into the continuous reactor system in a feed stream separate from that used to introduce phosgene. The aqueous caustic may be introduced through one or more inlets situated on the reactor system in such a way that the reaction between phosgene and the bisphenol affords a mixture comprising bisphenol monochloroformate and bisphenol bischloroformate, said mixture comprising less than 25% of the phosgene introduced in step (A) when it reaches the inlet or series of inlets used for the introduction of endcapping agent and catalyst in step (C). The aqueous caustic introduced in step (A) may be split into 2 or more feed streams, said feed streams being introduced at different points of the reactor system. Where multiple caustic streams are introduced in step (A) the molar flow rate of the caustic compound, for example sodium hydroxide, in the various caustic streams may be different from one another.

Under substantially adiabatic conditions, the amount of caustic introduced into a section of the reactor system, relative to the amount of bisphenol and other feed stream components present in the same section, affects the temperature of that section and ultimately the temperature of the entire reactor system. Within a given section of the reactor system, the relative rates of phosgene hydrolysis and bisphenol chloroformate formation may be strongly affected by the temperature. The optimal placement of caustic addition inlet or inlets used in step (A) of the instant invention for a given continuous reactor system design may be determined by simple experimentation. Placement of the caustic addition inlet or inlets used in step (A) is optimal when the formation of bisphenol chloroformates is maximized and phosgene hydrolysis is minimized.

In one aspect of the present invention, phosgene and caustic are introduced into the reactor system at molar flow rates which are based upon the molar flow rate of bisphenol introduction. It has been found preferable to specify relative molar flow rates of phosgene, bisphenol, and caustic rather than to specify a range of pH. This is because the relative molar flow rates are clearly defined, whereas pH may vary over the length of the continuous reactor system. Alternatively, it is sometimes preferred to specify a flow rate of one reagent, such as caustic, such that a desired pH range is achieved at a particular point in the reactor system, such as a continuous stirred tank reactor (CSTR) incorporated into the continuous reactor system or at the outlet of the reactor system. The molar flow rates of phosgene, caustic, and bisphenol are varied according to the desired characteristics of the product polycarbonate, such as molecular weight and the levels of residual monomer, endcapping agent and by-product diarylcarbonate present. Other factors affecting the preferred molar flow rates of phosgene, caustic, and bisphenol include the structures of the bisphenol and endcapping agent employed, the molar flow rate of catalyst, the relative amounts of inert solvent and water present, and the configuration of the continuous reactor system itself.

In Step (A), the ratio of the molar flow rates of phosgene to bisphenol introduced into the reactor system is preferably between about 1.0 to 1 and about 2.2 to 1, more preferably between about 1.4 to 1 and about 2.0 to 1. The ratio of the molar flow rates of the caustic (as equivalents of NaOH) to the bisphenol introduced into the reactor system is preferably between about 2 to 1 and about 4 to 1, more preferably between about 2.5 to 1 and about 3.75 to 1, and even more preferably between about 2.9 to 1 and about 3.6 to 1.

Bisphenols suitable for use in the present process are those having structure I

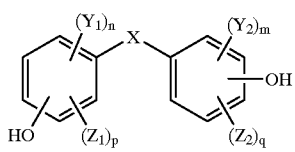

wherein X is selected from the group consisting of substituted or unsubstituted divalent $C_1$–$C_{18}$ hydrocarbon radicals, —S—, —O—, —SO—, —SO$_2$—, and carbonyl groups; each of $Z_1$ and $Z_2$ is independently at each occurrence hydrogen, a $C_1$–$C_{18}$ alkyl radical, a $C_3$–$C_{18}$ cycloalkyl radical, a $C_4$–$C_{18}$ aromatic radical, a $C_1$–$C_{18}$ alkoxy group, or a $C_4$–$C_{18}$ aryloxy group;
each of $Y_1$ and $Y_2$ is independently at each occurrence hydrogen, a fluorine, a chlorine, a bromine or an iodine atom; and
n, m, p and q are independently integers from 0 to 4.

Suitable bisphenols are illustrated by but not limited to, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane;1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane, 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydrhydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethyl-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5- trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-3,5,3',5'-tetrabromo-1,1-biphenyl; 4,4'-dihydroxy-3,5,3',5'-tetramethyl-1,1-biphenyl; 4,4'-dihydroxy-3„3'-dimethyl-1,1-biphenyl; 4,4'-dihydroxy-3,5,3',5'-tetramethyldiphenylether; 4,4'-dihydroxy-3,5,3',5'-tetrabromodiphenylether; 4,4'-dihydroxy-3,5,3',5'-tetramethyldiphenylthioether; 1,3-bis(2-(3,5-dimethyl-4-hydroxyphenyl)-2-propyl)benzene and 1,3-bis(2-(3,5-dibromo-4-hydroxyphenyl)-2-propyl)benzene.

Suitable endcapping agents for use in the process of the present invention are illustrated by structure II

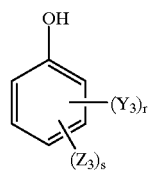

II wherein $Z_3$ is independently at each occurrence hydrogen, a $C_1$–$C_{18}$ alkyl radical, a $C_3$–$C_{18}$ cycloalkyl radical, a $C_4$–$C_{18}$ aromatic radical, a $C_1$–$C_{18}$ alkoxy group, or a $C_4$–$C_{18}$ aryloxy group;

$Y_3$ is independently at each occurrence hydrogen, a fluorine, a chlorine, a bromine or an iodine atom; and r and s are independently integers from 0 to 5.

One or more endcapping agents may be employed in the process of the instant invention and are used advantageously to limit the molecular weight of the product polycarbonate. Thus, where the endcapping agent is present in relatively small amounts, for example where the molar flow ratio of the endcapping agent to the bisphenol is less than about 0.05, high molecular weight polycarbonates are formed. Where polycarbonate oligomers, rather than high molecular weight polymer, are desired higher levels of endcapping agent II are used. Using the method of the present invention polycarbonates comprising having weight average molecular weights ($M_w$) ranging from about 500 to about 200,000 daltons may be prepared. Generally it is preferred that the molar flow ratio of endcapping agent to bisphenol be in a range between about 0.001 to 1 and about 0.60 to 1, preferably between about 0.01 to 1 and about 0.55 to 1, and still more preferably between about 0.03 to 1 and about 0.50 to 1.

Preferred endcapping agents are monofunctional phenols illustrated by phenol, p-cumylphenol, mesitol, 2,6-xylenol; 2,4-xylenol; 2,5-xylenol 2,3,5-xylenol; 2,3,6-xylenol; 2,4,6-triethylphenol; 2,4-di-t-butylphenol, 3,5-di-t-butylphenol, 2,6-dimethyl-4-nonylphenol; 2,6-dibromophenol; 2,5-dibromophenol; 2,6-dichlorophenol; 2,5-dichlorophenol 4-chloro-2,6-dibromophenol; 4-bromo-2,6-dichlorophenol;; 2,4,6-tribromophenol; 2,3,6-tribromophenol; 2,4,6-trichlorophenol; 2,3,6-trichlorophenol; 2,6-dimethyl-4-bromophenol; 4-t-butyl-2,6-dimethylphenol; 2,6-di-t-butyl-4-methylphenol, 3-t-butyl-2,6-dimethyl phenol; 2,6-diphenylphenol; 2-phenylphenol, 2-methyl-6-phenylphenol; 2-methyl-4-phenylphenol; and 2,6-dimethyl-4-phenylphenol.

Other suitable endcapping agents are phenol chloroformates illustrated by phenylchloroformate, 2,4,6-tribromophenylchloroformate, p-tert-butylphenylchloroformate and p-cumylphenylchloroformate.

Still other suitable endcapping agents are endcapping agents selected from the group consisting of $C_2$–$C_{30}$ carboxylic acids, $C_2$–$C_{30}$ carboxylic acid chlorides, $C_1$–$C_{30}$ monochloroformates. Suitable acid chloride endcapping agents are illustrated by benzoyl chloride, 2-naphthoyl chloride and trimethylacetyl chloride. Suitable carboxylic acid endcapping agents are illustrated by acetic acid, benzoic acid and 2-naphthoic acid.

In step (A) of the process of the present invention, a tertiary amine or quaternary ammonium salt, or mixture thereof may be added to catalyze the formation of bisphenol chloroformates. Where a catalyst is added in step (A), the catalyst is preferably added at a molar flow rate in a range corresponding to between about 0.001 and about 0.5 percent of the bisphenol molar flow rate. For example, given a bisphenol molar flow rate of 1.0 mole per minute, a molar flow rate of catalyst corresponding to 0.5 percent of the bisphenol molar flow rate would be 0.005 mole catalyst per minute. In step (C), at least one catalyst selected from the group consisting of tertiary amines and quaternary ammonium salts is added in order to catalyze the conversion of the mixture of chloroformates produced in steps (A) and (B) into endcapped polycarbonate. The preferred molar flow rate of catalyst in step (C) depends on the catalyst used. If the catalyst is triethylamine, for instance, the preferred catalyst molar flow rate is between about 0.1 and about 5.0 percent of the bisphenol molar flow rate. If the catalyst is dimethylbutylamine (DMBA), for instance, the preferred catalyst molar flow rate is between about 0.1 and about 2.0 percent of the bisphenol molar flow rate. If the catalyst is methyltributylammonium chloride, for instance, the preferred catalyst molar flow rate is between about 0.5 and about 2.0 percent of the bisphenol molar flow rate. In addition, mixtures of the catalysts may be used. The optimum catalyst flow rate, which may depend upon the structures of the bisphenol and endcapping agent as well as the reactor configuration, may be determined by experiment.

In one embodiment of the present invention the catalyst is a tertiary amine having structure III

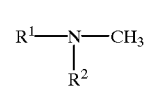

III wherein each $R^1$ and $R^2$ is independently a $C_1$–$C_{18}$ alkyl group, a $C_3$–$C_{18}$ cycloalkyl group, or $R^1$ and $R^2$ together form a $C_4$–$C_{20}$ cycloaliphatic ring which may be substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof. Suitable amine catalysts III are illustrated by, but are not limited to, N,N-dimethylethylamine, N,N-dimethylpropylamine, N,N-dimethylbutylamine, N,N-dimethylpentylamine, N,N- dimethylhexylamine, N,N-dimethylheptylamine, N,N-dimethyloctylamine, N,N-dimethylnonylamine, N,N-dimethyldecylamine, N,N-dimethyldodecylamine, N,N-dimethylhexadecylamine, N,N-dimethyloctadecylamine, N,N-diethylmethylamine, N,N-dipropylmethylamine, N,N-dibutylmethylamine, N,N-dipentylmethylamnine, N,N-dihexylmethylamine, N,N-didecylmethylamine, N-methylpyrrolidene, N-methylpiperidine, N-methylazacycloheptane, N-methylmorpholine, and 1,4-dimethylpipirazine.

In another aspect of the invention the catalyst employed is a tertiary amine not bearing a methyl group on nitrogen, such as triethylamine or diethylisopropylamine.

In another aspect of the present invention one or more quaternary ammonium salts may be employed as the catalyst. Quaternary ammonium salts are illustrated by tetramethylammonium chloride, methyltributylammonium chloride, 1-1-benzyl-4-N,N-dimethylaminopyridinium chloride, and 4-dimethylaminobutyltrimethylammonium chloride. In some instances quanidinium salts such as hexaethylguanidinium chloride are employed as the catalyst.

Suitable organic solvents for use in the process of the present invention include, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as chlorobenzene, o-dichlorobenzene, and the various chlorotoluenes. The chlorinated aliphatic hydrocarbons, especially methylene chloride, are preferred. The amount of solvent introduced in steps (A) and (C) is such that the organic solvent exiting the continuous reactor system contains between about 0.5 and about 60 weight percent, preferably 5 and about 50 weight percent and still more preferably about 10 and about 45 weight percent polycarbonate.

In one embodiment, the present invention provides a process for the preparation of polycarbonates of 3,3',5,5'-tetrabromobisphenol A (TBBPA), IV. In step (A) of the process, a first feed stream consisting essentially of phosgene, a second

IV

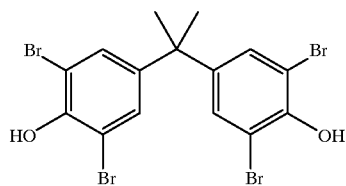

feed stream consisting essentially of TBBPA dissolved in aqueous sodium hydroxide, and third feed stream comprising methylene chloride and optionally a catalyst, are introduced into a continuous reactor system at ambient temperature to produce a flowing reaction mixture. The continuous reactor system may comprise, for example, a tubular reactor coupled to a stirred tank reactor the effluent of which is directed to a plug flow reactor. The continuous reactor system may be configured such that steps (A)–(C) take place in the tubular reactor. Step (D) may be initiated in the tubular reactor, continued in the continuous stirred tank reactor and completed in the plug flow reactor. Step (D) is complete when chloroformates are no longer detectable in the effluent from the plug flow reactor.

In step (A), the molar flow ratio of said phosgene to said TBBPA is in a range between about 1.6 to 1 and about 2.0 to 1. Additionally in step (A), the molar flow ratio of said aqueous sodium hydroxide to said TBBPA is in a range between about 2.5 to 1 and about 3.5 to 1. The catalyst, if catalyst is introduced in step (A), is introduced at a molar flow rate such that the amount of catalyst expressed as the molar flow ratio of said catalyst to said TBBPA is in a range between about 0.00001 and about 0.01, preferably in a range between about 0.001 and about 0.005.

In step (B), the flowing reaction mixture formed in step (A) passes through the continuous reactor and the phosgene and TBBPA react to form a mixture comprising bisphenol chloroformates, principally bisphenol monochloroformate V and bisphenol bischloroformate VI, in reactions mediated by sodium hydroxide and if

V

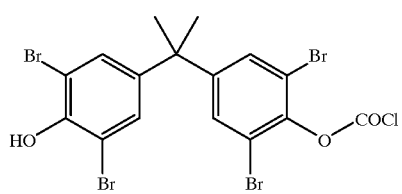

present, the catalyst. The reaction between TBBPA and phosgene depletes the amount of phosgene present in the flowing reaction mixture. Some phosgene, preferably less than about 30%, is consumed by hydrolysis. Step (B) is considered complete when the concentration of phosgene has been reduced to about 25% or less, preferably 10% or less of the phosgene introduced in step (A). The completion of step (B) corresponds to a reactant residence time of in a range between about 5 and about 250 seconds, preferably between about 25 and about 175 seconds.

VI

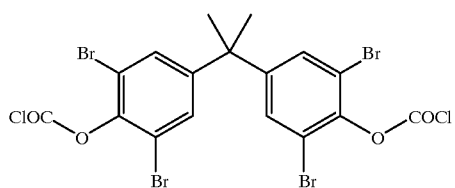

Step (C) of the process follows the completion of step (B). In step (C), a fourth feed stream comprising a catalyst having structure III, optionally dissolved in water or in an organic solvent such as methylene chloride, and a fifth feed stream comprising aqueous sodium hydroxide are introduced. Step (C) is carried out such that at least one of the fourth and fifth feed streams further comprises an endcapping agent having structure II. The flow rate of sodium hydroxide introduced in step (C) is such that the pH in the stirred tank reactor that is downstream of the tubular reactor is in the range of about 8 to about 10.5. The molar flow rate of said endcapping agent is such that the molar flow ratio of endcapping agent to TBBPA is in a range between about 0.01 to 1 and about 0.5 to 1. The molar flow rate of said catalyst is such that the molar flow ratio of said catalyst to TBBPA is in a range between about 0.001 to 1 and about 0.015 to 1. If other catalysts are used, the range of catalyst flow rate may be adjusted as specified above.

Step (D) of the process follows Step (C). In step (D) the mixture comprising chloroformates V and VI is converted by the action of the added base, endcapping agent, and catalyst into TBBPA polycarbonate. Step (D) comprises allowing the reaction mixture formed in steps (A)–(C) to react to completion to form a product polycarbonate, and continuously removing said product polycarbonate from the continuous reactor system.

The catalyst of steps (A) and (C) of the process is selected from the group consisting of tertiary amines having structure II, triethylamine, and quaternary ammonium salts. The catalyst employed in step (A) may be different from that employed in step (C).

The amount of solvent introduced in steps (A) and (C), methylene chloride, is such that the concentration of the solution of product polycarbonate in methylene chloride exiting the continuous reactor system following step (D) is in a range between about 5 and about 50 weight percent, preferably between about 10 and about 45 weight percent polycarbonate.

The endcapping agent employed in step (C) serves to limit the molecular weight of the product polycarbonate and provides materials in which the majority of the chain ends of the polycarbonate do not possess free phenolic OH groups. At a molar flow ratio of endcapping agent to TBBPA in a range between about 0.2 to 1 and about 0.5 to 1 endcapped polycarbonate oligomers are obtained.

The FIGURE sets forth one embodiment of the invention. The FIGURE illustrates a continuous reactor system comprising a tubular reactor coupled to a stirred tank reactor which is in turn coupled to a plug flow reactor. The tubular reactor is comprised of two sections, Reactor Section I and Reactor Section II. Feeds # 1–3 are introduced into the tubular reactor through an upstream inlet 1. Feeds 4 and 5 are introduced at downstream inlet 2. The reaction mixture formed by the combination of Feeds #1–5 exits the tubular reactor at outlet 3 and is fed into a continuous stirred tank reactor 4. The reaction mixture exits the continuous stirred tank reactor via outlet 5 and is fed to a plug flow reactor via inlet 6. Product polycarbonate exits the continuous reactor system at outlet 7.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

Testing for the presence of chloroformates was carried out with commercially available phosgene detection paper, such as Chemcasette SP from MDA Scientific of Lincolnshire, Ill., by spotting a portion of the reaction mixture onto the test paper. Reactions were considered complete when chloroformates were no longer detectable in the reaction mixture using this test. Molecular weights are reported as number average ($M_n$) or weight average ($M_w$) molecular weight and were determined by gel permeation chromatography (GPC) analysis, using polystyrene standards to construct a calibration curve against which polymer molecular weights were determined. The temperature of the gel permeation columns was about 40° C. and the mobile phase was chloroform. Product mixtures were tested for the presence of residual bisphenol and endcapping agent by reverse phase high performance liquid chromatography (BPLC).

Examples 1–4 and 6

The laboratory continuous reactor system illustrated in the FIGURE comprised a tubular reactor followed by a continuous stirred tank reactor (CSTR) having a volume of 750 milliliters, followed by a simulated plug flow reactor (SPFR). Steps (A) and (B), the steps in which the bisphenol was introduced and converted to a mixture comprising bisphenol monochloroformate and bisphenol bischloroformate, were carried out in said tubular reactor. Step (D), the condensation step wherein the mixture of bisphenol chloroformates formed in steps (A) and (B) was converted to polycarbonate, was initiated by step (C), the introduction of catalyst, endcapping agent and caustic to the tubular reactor at a point along said reactor at which the residence time of the initial reactants, bisphenol, phosgene, caustic and optionally catalyst, was in a range between about 27 and about 32 seconds. Thereafter, the mixture formed in steps (A), (B) and (C) was passed along the remaining length of the tubular reactor and fed into the continuous stirred tank reactor and thereafter into a simulated plug flow reactor. A plug flow reactor could be adequately simulated by a screw capped vial.

In Examples 1–4 and 6 the tube reactor having an inlet 1 and an outlet 2 consisted of two sections. The first section consisted of a series of six Ko-Flo® static mixer sections, each having a ¼ inch outer diameter and a length of 7 inches, followed by a single static mixer block. The static mixer block consisted of, in series, a mixing tube having a ¼ inch outer diameter and a length of 11 inches, a mixing tube having a ⅜ inch outer diameter and a length of 14 inches, and a mixing tube having a ½ inch outer diameter and a length of 14 inches. The combined volume of the first reactor section was about 82 milliliters. Under the conditions of Examples 1–4 and 6 the residence time of reactants and catalyst, Feeds 1–3, in the first reactor section was between about 27 and about 32 seconds.

Feeds 4 and 5 were added at the end of the first reactor section. The product mixture comprising mono- and bis-chloroformates formed in the first reactor section was thus combined with feeds 4 and 5 and introduced into the second reactor section. In Examples 1–4 the second reactor section consisted of three mixing blocks identical to the single mixing block found in the first reactor section. The three mixing blocks had a total volume of about 213 milliliters. In Example 6 the second reactor section consisted of five mixing blocks identical to the single mixing block found in the first reactor section. The five mixing blocks had a total volume of about 355 milliliters. In each of Examples 1–4 and 6 the product from the tube reactor was fed through an outlet into a continuous stirred tank reactor (CSTR). Any unreacted chloroformate groups remaining in the CSTR were consumed in a simulated plug flow reactor.

In Example 5 the tube reactor consisted of a single reactor section having an inlet and an outlet. The tube reactor consisted of six Ko-Flo® static mixer sections, each having a ¼ inch outer diameter and a length of 7 inches, followed by a series four static mixer blocks. Each static mixer block consisted of, in series, a mixing tube having a ¼ inch outer diameter and a length of 11 inches, a mixing tube having a ⅜ inch outer diameter and a length of 14 inches, and a mixing tube having a ½ inch outer diameter and a length of 14 inches. The combined volume of the first reactor section was about 295 milliliters. Under the conditions of Example 5 the residence time of reactants and catalyst, Feeds 1–3, in the tube reactor was about 116 seconds. Feeds 4 and 5 together with the product formed in the tube reactor were added to the continuous stirred tank reactor (CSTR). Any unreacted chloroformate groups remaining in the CSTR were consumed in a simulated plug flow reactor.

In Examples 1–6 the effluent from the CSTR was sampled periodically. The sampled product was sealed in a vial and stirred at ambient temperature. The vials were assayed periodically for the presence of chloroformates which, if present initially, were rapidly converted to carbonate units. This stage of the process involving the consumption of any residual chloroformate groups in a sample vial, simulates conditions present in a plug flow reactor. Under the conditions of Example 5, additional catalyst was required in order to complete the conversion of residual chloroformate groups present in the effluent of the CSTR to carbonate groups, however, no further caustic was required. Under the conditions of Example 6, the caustic added in step C was split into 2 parts, one part being feed to the reactor at a location along the tubular reactor where the residence time of the reactants was about 32 seconds (See Table 1, Feed 5, Examples 1–4 and 6) and the other half was fed into the CSTR (See Table 1, Feed 6, Example 6).

In each of Examples 1–6 the residence time in the CSTR was about 5 minutes. Typical times required for complete conversion of any residual chloroformate groups to carbonate groups in the simulated plug flow reactor were from about 1 to about 5 minutes. The CSTR comprised a 0.75 liter vessel with a reflux condenser, a recirculating loop that housed a pH electrode, a twin 6-blade (straight) impeller, an inlet port for the effluent of the tube reactor and additional feeds, and an outlet port. The reaction was carried out in hood designed for phosgene usage. In Examples 1–4 and 6, no phosgene was detected in the product leaving the third static mixer block, the first static mixer block being coupled to the furthest downstream six Ko-Flo® static mixer section. Additionally, the CSTR was vented to a caustic scrubber to destroy any adventitious phosgene escaping the system.

When no further chloroformate groups could be detected in a sample vial simulating a plug flow reactor, the sample was quenched with 1N HCl and the organic phase was analyzed by HPLC for residual endcapping agent and residual bisphenol. The organic phase was also analyzed by GPC in order to characterize the product polycarbonate.

Compositions are given in Table 1 for the six reactor feeds employed in Steps (A) and (C) of Examples 1–6. The feeds are numbered based upon their composition. Thus a feed comprising neat phosgene is designated Feed #1 in each of Examples 1–6. The feed comprising the sodium salt of tetrabromobisphenol A in water is designated Feed #2 in Examples 1–6. Note that the exact composition of Feed #2 was varied from one Example to another as indicated in Table 1. In Examples 1–4 Feed #3 consisted of a solution of the amine catalyst DMBA in methylene chloride. In Examples 5 and 6 Feed #3 consisted of methylene chloride alone. In each of Examples 1–4 and 6 Feed #4 was introduced through an inlet into the continuous reactor system at a point where reactants introduced in step (A) had a residence time of about 27 seconds. In each of Examples 1–4 and 6, Feed #4 comprised a methylene chloride solution of DMBA catalyst and p-tert-butylphenol. In Examples 14 and 6 Feed #5 was a solution of 5% by weight NaOH in water which was introduced through an inlet into the continuous reactor system at a point where reactants introduced in step (A) had a residence time between about 27 and about 32 seconds. In Example 5, Feed #5 was introduced through an inlet into the continuous reactor system at a point where reactants introduced in step (A) had a residence time of about 116 seconds and consisted of a solution of 2.5% by weight NaOH in water. Feed #6, employed only in Example 6, consisted of a solution of 5% by weight NaOH in water and was introduced through an inlet directly into the CSTR. In Example number 6, at the outlet of the tubular reactor into the CSTR, the total residence time of reactants introduced in step (A) was about 158 seconds.

TABLE 1

| Feed # | Example(s)[a] | Step[b] | Residence Time[c] | Feed Composition |
|---|---|---|---|---|
| 1 | 1–6 | A | 0 | Neat phosgene gas |
| 2 | 1 and 2 | A | 0 | 85.3 g TBBPA, 38.4 g 50% NaOH, 876.2 g H$_2$O |
| 2 | 3 and 4 | A | 0 | 102.5 g TBBPA, 37.7 g 50% NaOH, 859.8 g H$_2$O |
| 2 | 5 and 6 | A | 0 | 119.7 gm TBBPA, 52.8 gm 50 wt % NaOH, 827.5 gm H$_2$O |
| 3 | 1–4 | A | 0 | 52 mg DMBA, 1 kg CH$_2$Cl$_2$ |
| 3 | 5 and 6 | A | 0 | Reagent CH$_2$Cl$_2$ |
| 4 | 1–4 & 6 | C | 27 | 1.98 g DMBA, 98.0 g p-TBP[d], 900 g CH$_2$Cl$_2$ |
| 4[e] | 5 | C | 116 | 1.98 g DMBA, 98.0 g p-TBP[d], 900 g CH$_2$Cl$_2$ |
| 5 | 1–4, 6 | C | 27–32 | 100 g 50% NaOH, 900 g H$_2$O (5 wt % NaOH) |
| 5[e] | 5 | C | 116 | 50 g 50% NaOH, 950 g H$_2$O (2.5 wt % NaOH) |
| 6[e] | 6 | C | 158 | 100 g 50% NaOH, 900 g H$_2$O (5 wt % NaOH) |

[a]Feed used in Examples specified
[b]Feed introduced in step indicated
[c]Point of addition of the indicated feed into the continuous reactor system where reactants introduced in step (A) have the indicated approximate residence time in seconds
[d]p-t-butyl phenol
[e]feed added directly to CSTR As indicated in Table 2, in Examples 1–6 the rate of introduction of Feed #1 was kept constant at 3.18 grams per minute (gram/min) while the rates at which feeds 2–5 were introduced were varied from Example to Example. Feed #6 was introduced only in Example 6. The pH of the product mixture was shown to depend upon the compositions of the various feeds and the rates at which each feed was introduced.

TABLE 2

| Feed Rate (gram/min) | Example 1 | Example 2 | Example 3 | Example 4 | Example 5 | Example 6 |
|---|---|---|---|---|---|---|
| Feed 1 | 3.18 | 3.18 | 3.18 | 3.18 | 3.18 | 3.18 |
| Feed 2 | 97.6 | 97.6 | 117.2 | 117.2 | 79.0 | 79.0 |
| Feed 3 | 90 | 90 | 90 | 90 | 91.2 | 91.2 |
| Feed 4 | 11.7 | 11.7 | 11.7 | 11.7 | 11.2 | 11.2 |
| Feed 5 | 23.5 | 31.8 | 15.4 | 22.6 | 54 | 9.3 |
| Feed 6 | 0 | 0 | 0 | 0 | 0 | 8.5 |
| CSTR pH | 9 | 11.2 | 8.7 | 10.8 | 9.2 | 9.1 |

Product compositions are given in Table 3 and illustrate the successful conversion of TBBPA to polycarbonate oligomers having molecular weights rationally related to the level of endcapping agent employed, free from residual TBBPA, containing only limited amounts of unreacted endcapping agent, p-t-butylphenol. and diarylcarbonate (DAC).

TABLE 3

| | Example 1 | Example 2 | Example 3 | Example 4 | Example 5 | Example 6 |
|---|---|---|---|---|---|---|
| Mw[a] | 6420 | 7840 | 4910 | 5920 | 3000 | 3430 |
| Mn | 2120 | 2410 | 2170 | 2150 | 1893 | 2005 |
| TBBPA[b] | <25 ppm | <25 ppm | <25 ppm | <25 ppm | <25 ppm | <25 ppm |

TABLE 3-continued

|   | Example 1 | Example 2 | Example 3 | Example 4 | Example 5 | Example 6 |
|---|---|---|---|---|---|---|
| Endcap[c] | 341 ppm | <25 ppm | 2026 ppm | 1421 ppm | 1600 ppm | 3940 ppm |
| DAC[d] | 3.8% | 4.3% | 2.0% | 3.3% | 0.7% | 1.0% |

[a]Molecular weights relative to polysterene standards.
[b]TBBPA relative to polycarbonate sample.
[c]p-t-butylphenol relative to polycarbonate sample.
[d]Di(p-t-butyl phenyl carbonate) relative to polycarbonate sample.

The invention has been described in detail with particular reference to preferred embodiments thereof, but it will be understood by those skilled in the art that variations and modifications can be effected within the spirit and scope of the invention.

What is claimed is:

1. A continuous process for the preparation of endcapped oligomeric polycarbonate comprising the following steps:

Step (A) introducing into a continuous reactor system phosgene, at least one solvent, at least one bisphenol, caustic, and optionally one or more catalysts, thereby forming a flowing reaction mixture; said phosgene, solvent, bisphenol, caustic, and catalyst being introduced as components of at least 2 feed streams, said phosgene and said bisphenol being introduced at such a rate to produce a molar flow ratio of phosgene to bisphenol in a range between about 1.0 to 1 and about 2.0 to 1, said caustic being introduced at such a rate to produce a molar flow ratio of caustic to said bisphenol in a range between anout 2.0 and about 4.0 to 1;

Step (B) passing the flowing reaction mixture formed in Step (A) through said continuous reactor system until substantially all of the phosgene has been consumed;

Step (C) introducing into said flowing reaction mixture in which substantially all of the phosgene has been consumed, said flowing reaction mixture comprising principally the monochloroformate and the bischloroformate of the bisphenol, additional caustic, at least one endcapping agent, optionally one or more solvents, and at least one tertiary amine catalyst; said additional caustic, endcapping agent, solvent and catalyst being introduced as one or more feed streams, said endcapping agent being introduced at such a rate to produce a molar flow ratio of endcapping agent to said bisphenol in a range between about 0.1 to 1 and about 0.5 to 1, said additional caustic being introduced at such a rate to produce a pH in a product stream exiting said reactor system between about 8 and about 12, said catalyst being introduced at such a rate to produce a molar flow ratio of catalyst to said bisphenol in a range between about 0.001 to 1 and about 0.05 to 1, said catalyst having structure III

I

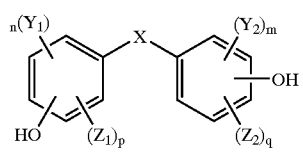

wherein each $R^1$ and $R^2$ is independently a $C_1$–$C_{18}$ alkyl group, a $C_3$–$C_{18}$ cycloalkyl group, or $R^1$ and $R^2$ together form a $C_4$–$C_{20}$ cycloaliphatic ring which may be substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof; and Step (D) allowing the reaction mixture formed in steps (A)–(C) to react to form a product endcapped oligomeric polycarbonate and continuously removing said product endcapped oligomeric polycarbonate from the continuous reactor system, said endcapped oligomeric polycarbonate comprising less than 25 ppm residual bisphenol, said endcapped oligomeric polycarbonate comprising less than 1 percent by weight residual endcapping agent, said endcapped oligomeric polycarbonate comprising less than 5 percent by weight residual diarylcarbonate.

2. A process according to claim 1 wherein said bisphenol of step (A) has structure I

III

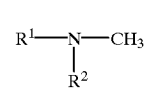

wherein X is selected from the group consisting of substituted or unsubstituted divalent $C_1$–$C_{18}$ hydrocarbon radicals, —S—, —O—, —SO—, —SO$_2$—, and a carbonyl group;
each of $Z_1$ and $Z_2$ is independently at each occurrence hydrogen, a $C_1$–$C_{18}$ alkyl radical, a $C_3$–$C_{18}$ cycloalkyl radical, a $C_4$–$C_{18}$ aromatic radical, a $C_1$–$C_{18}$ alkoxy group, or a $C_4$–$C_{18}$ aryloxy group;
each of $Y_1$ and $Y_2$ is independently at each occurrence hydrogen, a fluorine, a chlorine, a bromine or an iodine atom; and
n, m, p and q are independently integers from 0 to 4.

3. A process according to claim 2 wherein said bisphenol is selected from the group comprising 2,2-bis(3,5-dibromo 4-hydroxyphenyl)propane; 2,2-bis(2,3,5,6-tetrabromo-4-hydroxyphenyl)propane; 2,2-bis(3,5-dichloro-4-hydroxyphenyl)propane; and 2,2-bis(3,5-dimethyl-4-hydroxyphenyl)propane.

4. A process according to claim 1 wherein said endcapping agent of step (C) has structure II

II

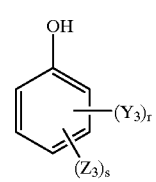

wherein $Z_3$ is independently at each occurrence hydrogen, a $C_1$–$C_{18}$ alkyl radical, a $C_3$–$C_{18}$ cycloalkyl radical, a $C_4$–$C_{18}$ aromatic radical, a $C_1$–$C_{18}$ alkoxy group, or a $C_4$–$C_{18}$ aryloxy group;
$Y_3$ is independently at each occurrence hydrogen, a fluorine, a chlorine, a bromine or an iodine atom; and
r and s are independently integers from 0 to 5.

5. A process according to claim 4 wherein said endcapping agent is selected from the group consisting of phenol, 4-bromophenol, 2,4,6-tribromophenol, p-tert-butylphenol, and p-cumylphenol.

6. A process according to claim 1 wherein said endcapping agent of step (C) is selected from the group consisting of $C_2$–$C_{30}$ carboxylic acids, $C_2$–$C_{30}$ carboxylic acid chlorides, $C_1$–$C_{30}$ monochloroformates.

7. A process according to claim 6 wherein said endcapping agent is selected from the group consisting of phenylchloroformate, 2,4,6-tribromophenylchloroformate, p-tert-butylphenylchloroformate and p-cumylphenylchloroformate.

8. A process according to claim 1 wherein said tertiary amine catalyst is N,N-dimethylbutylamine.

9. A process according to claim 1 wherein in step (A) about 1.0 to about 2.0 moles of said phosgene, about 2.0 to about 4.0 moles of said caustic, and 0 to about 0.005 moles of said catalyst is introduced for every mole of bisphenol introduced.

10. A process according to claim 1 wherein in step (C) about 0.001 to about 0.02 moles of said catalyst and about 0.1 to about 0.5 moles of said endcapping agent is introduced for every mole of bisphenol introduced in step (A) and sufficient caustic to obtain a pH of from about 8 to about 10.5. at the reactor outlet.

11. A process according to claim 1 wherein the temperature of the reactor system is maintained in a range between about 10° C. about 60° C.

12. A process according to claim 1 wherein the temperature of the reactor system is maintained in a range between about 25° C. about 50° C.

13. A process according to claim 1 wherein at step (C) the flowing reaction mixture contains less than 2 percent of the phosgene introduced in step (A).

14. A process according to claim 1 wherein at step (C) the flowing reaction mixture contains less than 1 percent of the phosgene introduced in step (A).

15. A process according to claim 1 wherein at least one of said continuous reactor systems of steps (A) and (D) comprises a tubular reactor.

16. A process according to claim 1 wherein at least one of said continuous reactor systems of steps (A) and (D) comprises an agitated column reactor.

17. A process according to claim 1 wherein at least one of said continuous reactor systems of steps (A) and (D) comprises a continuous stirred tank reactor.

18. A process according to claim 1 wherein said continuous reactor system of step (A) comprises a series of two or more continuous stirred tank reactors.

19. A process according to claim 1 wherein said continuous reactor system of step (D) comprises a series of two or more continuous stirred tank reactors.

20. A process according to claim 1 wherein the continuous reactor system of step (D) is a continuous stirred tank reactor, a tubular reactor, or an agitated column reactor.

21. A continuous process for the preparation of endcapped oligomeric tetrabromobisphenol A polycarbonate comprising the following steps:

Step (A) introducing into a continuous reactor system a first feed stream consisting essentially of phosgene, a second feed stream consisting essentially of tetrabromobisphenol A and aqueous sodium hydroxide, and a third feed stream comprising methylene chloride and optionally a catalyst, thereby forming a flowing reaction mixture; said feed streams being introduced such that a molar flow ratio of said phosgene to said tetrabromobisphenol A is in a range between about 1.4 to 1 and about 2.0 to 1, a molar flow ratio of said sodium hydroxide to tetrabromobisphenol A is in a range between about 2.0 to 1 and about 4.0 to 1, and a molar flow ratio of said catalyst to tetrabromobisphenol A is in a range between about 0.0 to 1 and about 0.005 to 1;

Step (B) passing the flowing reaction mixture formed in Step (A) through said continuous reactor system until substantially all of the phosgene has been consumed;

Step (C) introducing into said flowing reaction mixture in which substantially all of the phosgene has been consumed, said flowing reaction mixture comprising principally the monochloroformate and the bischloroformate of tetrabromobisphenol A, a fourth feed stream comprising a catalyst and optionally methylene chloride and an endcapping agent, and a fifth feed stream comprising aqueous sodium hydroxide and optionally an endcapping agent, said feed streams being introduced such that a molar flow ratio of said catalyst to tetrabromobisphenol A is in a range between about 0.001 to 1 and about 0.05 to 1; and a molar flow ratio of said endcapping agent to tetrabromobisphenol A is in a range between about 0.1 to 1 and about 0.5 to 1, said catalyst having structure III

wherein each $R^1$ and $R^2$ is independently a $C_1$–$C_{18}$ alkyl group, a $C_3$–$C_{18}$ cycloalkyl group, or $R^1$ and $R^2$ together form a $C_4$–$C_{20}$ cycloaliphatic ring which may be substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof; and Step (D) allowing the reaction mixture formed in steps (A)–(C) to react to completion to form a product endcapped oligomeric tetrabromobisphenol A polycarbonate and continuously removing said product endcapped oligomeric tetrabromobisphenol A polycarbonate from the continuous reactor system, said endcapped oligomeric tetrabromobisphenol A polycarbonate comprising less than 25 ppm residual tetrabromobisphenol A, said encapped oligomeric tetrabromobisphenol A polycarbonate comprising less than 1 percent be weight residual endcapping agent, said endcapped oligomeric tetrabromobisphenol A polycarbonate comprising less than 5 percent by weight residual diaryl carbonate.

22. A process according to claim 21 wherein the catalyst is N,N-dimethylbutylamine.

23. A process according to claim 21 wherein the rate of sodium hydroxide addition in steps (A) and (C) is sufficient to maintain a pH in a range between about 8 and about 12 during step (D).

24. A process according to claim 21 wherein the endcapping agent is selected from the group consisting of phenol, 4-bromophenol, 2,4,6-tribromophenol, p-t-butylphenol and p-cumylphenol.

25. A process according to claim 21 wherein the endcapping agent is selected from the group consisting of phenylchloroformate, 2,4,6-tribromophenylchloroformate and p-cumylchloroformate.

26. A process according to claim 21 wherein the molar flow ratio of phosgene to tetrabromobisphenol A is about 1.60 to about 1.85.

27. A process according to claim 21 wherein at least one of said continuous reactor systems of steps (A) and (D) comprises a tubular reactor.

28. A process according to claim 21 wherein at least one of said continuous reactor systems of steps (A) and (D) comprises an agitated column reactor.

29. A process according to claim 21 wherein said continuous reactor system of step (A) comprises a series of two or more continuous stirred tank reactors.

30. A process according to claim 21 wherein said continuous reactor system of step (D) comprises a series of two or more continuous stirred tank reactors.

31. A process according to claim 21 wherein the continuous reactor system of step (D) is a continuous stirred tank reactor, a tubular reactor, or an agitated column reactor.

32. A continuous process for the preparation endcapped oligomeric tetrabromobisphenol A polycarbonate comprising the following steps:

Step (A) introducing into a continuous reactor system a first feed stream consisting essentially of phosgene, a second feed stream consisting essentially of tetrabromobisphenol A and aqueous sodium hydroxide, and a third feed stream comprising methylene chloride, thereby forming a flowing reaction mixture; said feed streams being introduced such that a molar flow ratio of said phosgene to said tetrabromobisphenol A is in a range between about 1.6 to 1 and about 2.0 to 1, and a molar flow ratio of said sodium hydroxide to tetrabromobisphenol A is in a range between about 2.5 to 1 and about 3.5 to 1;

Step (B) passing the flowing reaction mixture formed in Step (A) through said continuous reactor system until at least 90 percent of the phosgene has been consumed;

Step (C) introducing into said flowing reaction mixture in which at least 90 percent of the phosgene has been consumed, said flowing reaction mixture comprising principally the monochloroformate and the bischloroformate of tetrabromobisphenol A, a fourth feed stream comprising methylene chloride, a phenolic endcapping agent and a tertiary amine catalyst having structure III

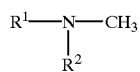

III wherein each $R^1$ and $R_2$ is independently a $C_1$–$C_{18}$ alkyl group, a $C_3$–$C_{18}$ cycloalkyl group, or $R^1$ and $R^2$ together form a $C_4$–$C_{20}$ cycloaliphatic ring which may be substituted by one or more $C_1$–$C_{20}$, $C_6$–$C_{20}$ aryl, $C_5$–$C_{20}$ aralkyl, $C_5$–$C_{20}$ cycloalkyl groups, or a combination thereof;

and a fifth feed stream comprising aqueous sodium hydroxide, said fourth and fifth feed streams being introduced such that a molar flow ratio of said catalyst to tetrabromobisphenol A is in a range between about 0.010 to 1 and about 0.014 to 1, and a molar flow ratio of said endcapping agent to tetrabromobisphenol A is in a range between about 0.3 to 1 and about 0.5 to 1, and a molar flow ratio of sodium hydroxide to tetrabromobisphenol A is in a range between about 1.7 to 1 and about 2.1 to 1; and Step (D) allowing the reaction mixture formed in steps (A)–(C) to react to completion to form a product endcapped oligomeric tetrabromobisphenol A polycarbonate and continuously removing said product endcapped oligomeric tetrabromobisphenol A polycarbonate from the reactor system, said endcapped oligomeric tetrabromobisphenol A polycarbonate having a weight average molecular weight of less than 5000 daltons, said endcapped oligomeric tetrabromobisphenol A polycarbonate containing less than 1 percent by weight diarylcarbonate.

* * * * *